Dec. 3, 1957    E. J. SHELTON, JR., ET AL    2,815,465
HEATER ASSEMBLIES FOR VACUUM TUBES
Filed May 31, 1955
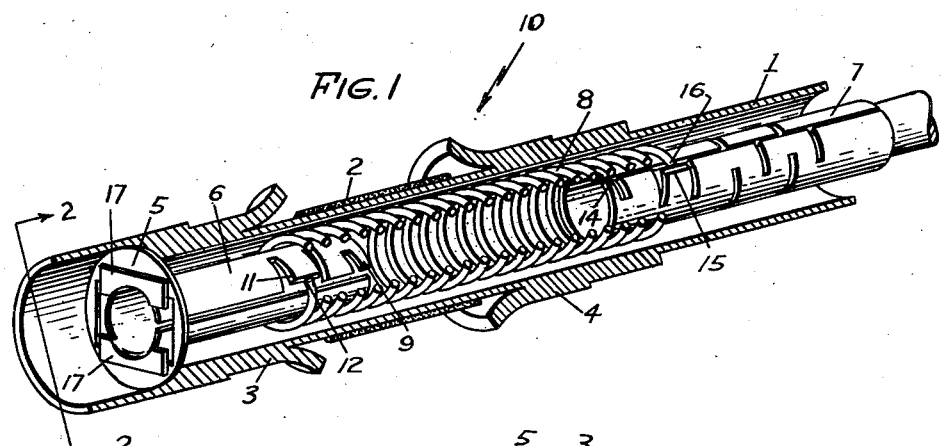
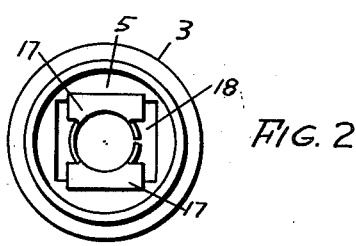
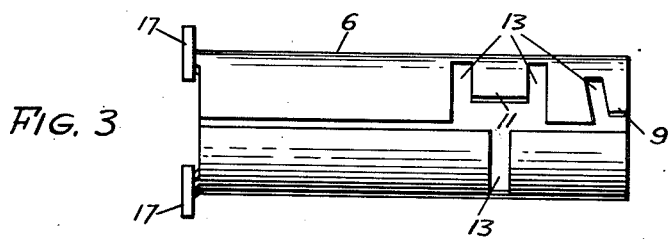
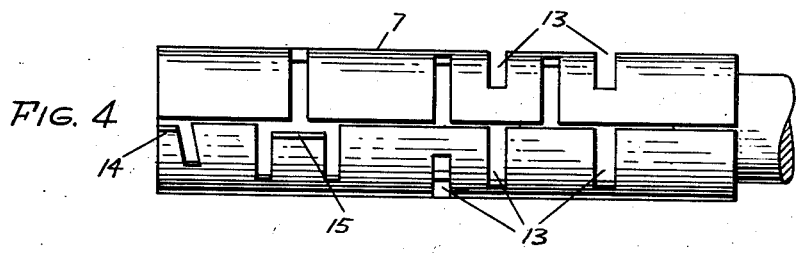
INVENTORS
EARL J. SHELTON, JR.
ALEXANDER A. PHILLIPS
BY *Elmer J. Gorn*
ATTORNEY United States Patent Office 2,815,465
Patented Dec. 3, 1957

2,815,465

HEATER ASSEMBLIES FOR VACUUM TUBES

Earl J. Shelton, Jr., Needham, and Alexander A. Phillips, Sudbury, Mass., assignors to Raytheon Manufacturing Company, Waltham, Mass., a corporation of Delaware Application May 31, 1955, Serial No. 512,145

6 Claims. (Cl. 313—337)

This invention relates generally to cathode structures, and more particularly to a novel heater coil assembly for heating cathode structures to desired operating temperatures.

This invention represents an improvement over the cathode structure shown in U. S. Patent No. 2,532,215 to L. A. Williams, and assigned to the same assignee as the present application. In the patent above referred to, the heater coil is threadedly attached to current-carrying support members in order to heat the coil, and hence the electron-emitting surface of the cathode to a desired temperature. The particular advantage of this type of assembly lies in the fact that there is no need to weld or braze the tungsten heater coil to its support members, a highly desirable feature since, among other things, the tungsten coil becomes brittle as a result of any welding process, and in the past has caused considerable tube failure. However, certain constructional and economic factors make the use of these prior art devices something less than satisfactory.

In the known devices, the heater coil is screwed into threads machined into a solid piece of molybdenum. It has been found that this construction, while successfully eliminating brazing the heater coil, creates a difficult time-consuming problem in properly out-gassing the finished tube due to the relatively large cross-sectional area of the molybdenum studs holding the heater coil. As a consequence tubes so constructed tend to be unstable, and exhibit shortened life characteristics. In addition, the use of studs, into which threads have to be machined prior to use, causes this construction to be unduly expensive.

Accordingly, the present invention is directed toward a novel heater assembly which not only eliminates brazing the tungsten coil, but also cuts out-gassing time down to a bare minimum, and no longer necessitates the use of expensive machined studs to threadedly hold the heater coil. With the present invention, the heater coil can be screwed onto hollow support tubes, and securely locked in place without the use of machined threads on the support tubes. Since the support members can thus have their solid portion reduced to a minimum, out-gassing of the tube is considerably facilitated. The support tubes are stamped from sheet stock, and rolled to a cylindrical shape provided with a virtual thread rather than machined threads, thus eliminating expensive machining operations of the prior art.

The invention will be better understood as the following description proceeds taken in conjunction with the accompanying drawing wherein:

Fig. 1 is a side, sectional, perspective view of a cathode structure having a heater coil assembly in accordance with the present invention;

Fig. 2 is an end view of the structure of Fig. 1 taken on the line 2—2;

Fig. 3 is a greatly enlarged side view of one support member onto which one end of the heater coil may be screwed; and Fig. 4 is a greatly enlarged side view of another support member for the heater coil.

Referring now to the drawing, and more particularly to Fig. 1 thereof, there is shown generally at 10 a cathode structure comprising an outer cylindrical sleeve 1 of suitable refractory material, such as molybdenum, which serves as a rigid supporting member for the electron-emissive portion 2. Sleeve 1 has attached thereto, in a conventional manner, a plurality of end shields 3 and 4, the former of which has a disk member 5 secured to the inner surface thereof in a suitable manner, as by brazing.

To supply the necessary heat for raising electron-emissive portion 2 to the desired operating temperature, the cathode structure is provided with a heater assembly disposed centrally within sleeve 1, and comprising a pair of support tubes 6 and 7, to which a bare heater coil 8, preferably of tungsten, may be threadedly fastened in a screw-like relationship. Support tube 6 is preferably of molybdenum, and is constructed of stamped sheet stock provided with a plurality of heat-choke slots 13. The sheet stock may then be rolled into the cylindrical form shown in the drawing. As best shown in Fig. 1, tube 6 is provided with a plurality of raised tabs 9 and 11. Tab 9 is formed so as to radially project between the turns of coil 8, and serves as a guide member or virtual thread when one end of the coil is screwed onto support tube 6. The pitch of tab 9 is made greater than the pitch of the turns of coil 8, thus slightly distending the coil when engagement is made, and thereby securely holding the coil on the support tube. After the end turn of coil 8 is engaged by tab 9, the coil may then be turned in a clockwise direction until end 12 of the coil comes into contact with stop-tab 11 which acts to prevent further rotation of the coil. Heater coil 8 is then securely and rigidly attached to tube 6 by a wound coupling or joint without the necessity of any other fastening process, such as brazing or welding, being performed.

In a similar manner, support tube 7 is also of stamped sheet stock preferably rolled into a cylindrical shape, and provided with heat-choke slots 13, and with a guide-tab 14, and a stop-tab 15. Guide-tab 14, which also forms a virtual thread, may be engaged with the opposite end of coil 8, and also turned in a clockwise direction until end 16 of the coil comes into contact with tab 15, thus preventing further rotation of the coil.

After the heater elements have been assembled in the foregoing manner, the complete assembly may be inserted into sleeve 1 and fastened in spaced relation thereto. To accomplish this, support 6 is provided with a pair of rectangularly-shaped lips 17, so dimensioned as to barely pass through a rectangular-shaped opening 18 in disk member 5. After the lips 17 have cleared the opening 18, the entire heater assembly may be given a 90° turn, whereupon lips 17 contact the surface of disk 5, and may be securely attached thereto, as by welding. Support 7 may then be insulatingly supported with respect to sleeve 1 in a manner as, for example, shown in the patent referred to above, thus slightly tensioning coil 8, and preventing it from sagging against sleeve 1 when the coil is heated.

Because support members 6 and 7 are constructed of rolled sheet stock and thereby made hollow, the cross-sectional area of the tubes can be reduced to a desired degree consistent with adequate strength. This feature has been found to form a considerable improvement over prior devices wherein solid support members were utilized, since, due to the reduced cross-section, the effectiveness of out-gassing is considerably increased with a corresponding reduction of out-gassing time. The virtual-thread concept of the present invention also results in the formation of a rigid, reliable structure at greatly reduced manufacturing expense.

Although there has been described what is considered to be a preferred embodiment of the present invention, various adaptations and modifications thereof may be made without departing from the spirit and scope of the invention as defined in the appended claims.

What is claimed is:

1. In combination, an outer conducting sleeve capable of emitting electrons when heated, a heater assembly disposed within said sleeve, said assembly comprising a plurality of hollow support members each having means constituting a virtual thread, and a coil threadedly engaging said virtual thread on said support members.

2. In combination, an outer conducting sleeve capable of emitting electrons when heated, a heater assembly disposed within said sleeve, said assembly comprising a plurality of hollow, cylindrical support members each having means constituting a virtual thread, and a coil threadedly engaging said virtual thread on said support members.

3. In combination, an outer conducting sleeve capable of emitting electrons when heated, a heater assembly disposed within said sleeve, said assembly comprising a plurality of hollow support members having raised portions forming tabs thereon, said tabs constituting a virtual thread, and a coil in engagement with said tabs on said support members.

4. In combination, an outer conducting sleeve capable of emitting electrons when heated, a heater assembly disposed within said sleeve, said assembly comprising a plurality of hollow support members having raised portions forming tabs thereon, and a coil threadedly engaging at least one of said tabs on each of said support members.

5. In combination, an outer conducting sleeve of refractory material, an electron-emissive coating supported on the outside of said sleeve, a heater assembly disposed within said sleeve, said assembly comprising a plurality of hollow support members having tabs thereon, at least one of said tabs constituting a virtual thread, and a coil having the pitch of the turns thereof less than the pitch of said one tab, said coil being threadedly engaged with said tab.

6. In combination, an outer conducting sleeve of refractory material, an electron-emissive coating supported on the outside of said sleeve, a heater assembly disposed within said sleeve, said assembly comprising a plurality of hollow support members having raised portions forming tabs thereon, said tabs constituting a virtual thread, and a coil in engagement with said tabs on said support members.

References Cited in the file of this patent

UNITED STATES PATENTS

| | | |
|---|---|---|
| 2,239,416 | Ehrenberg | Apr. 22, 1941 |
| 2,441,224 | Hector | May 11, 1948 |
| 2,532,215 | Williams | Nov. 28, 1950 |